(12) United States Patent
Elder et al.

(10) Patent No.: US 7,191,684 B2
(45) Date of Patent: Mar. 20, 2007

(54) MECHANISM AND METHOD FOR ROTATING A MACHINE TOOL ELEMENT

(76) Inventors: Jack E. Elder, 384 Olivewood Ct., Rochester, MI (US) 48306; Scott K. Wilson, 355 Oak Arbor Dr., Rochester, MI (US) 48306

( * ) Notice: Subject to any disclaimer, the term of this patent is extended or adjusted under 35 U.S.C. 154(b) by 776 days.

(21) Appl. No.: 09/952,506

(22) Filed: Sep. 13, 2001

(65) Prior Publication Data

US 2002/0081350 A1    Jun. 27, 2002

Related U.S. Application Data

(60) Provisional application No. 60/232,656, filed on Sep. 14, 2000.

(51) Int. Cl.
    *B23B 29/00* (2006.01)
(52) U.S. Cl. .................................. 74/813 R
(58) Field of Classification Search ............. 74/813 R, 74/816, 817, 825, 813 C, 813 L; 425/574, 425/576
See application file for complete search history.

(56) References Cited

U.S. PATENT DOCUMENTS

| | | | |
|---|---|---|---|
| 726,110 A | 4/1903 | Street | |
| 1,033,882 A | 7/1912 | Desmond | |
| 1,400,236 A | 12/1921 | Pfeffer | |
| 1,539,307 A | 5/1925 | Farnsworth | |
| 2,194,374 A | 3/1940 | Wünsch | |
| 4,840,557 A | 6/1989 | Ishimoto et al. | 425/555 |
| 5,314,327 A | 5/1994 | Stein | 425/589 |
| 5,336,462 A | 8/1994 | Wohlrab | 264/328.1 |
| 5,660,783 A | 8/1997 | Urbanek et al. | 264/328.1 |
| 5,837,301 A | 11/1998 | Arnott et al. | 425/574 |
| 5,853,773 A | 12/1998 | Choi | 425/136 |
| 5,910,328 A | 6/1999 | Oshiro et al. | 425/595 |

*Primary Examiner*—Chong H. Kim
(74) *Attorney, Agent, or Firm*—Maginot, Moore & Beck

(57) ABSTRACT

A rotate mechanism includes a fixed frame unit, a rotating frame unit, a first bearing, and a prime mover. The rotating frame unit is rotatably coupled to the fixed frame unit and rotates about an axis. The rotating frame unit includes a first surface for receiving a machine tool element to be rotated. The first bearing is configured to exert an axially outward force on the rotating frame unit. The first bearing rotates about an axis that extends in substantially perpendicular to an axis of rotation of the rotating frame unit. The first bearing is axially movable within a cavity of at least one of the rotating frame unit and the fixed frame unit. The prime mover is coupled to the rotating frame unit to effectuate rotational movement thereof.

24 Claims, 4 Drawing Sheets

MECHANISM AND METHOD FOR ROTATING A MACHINE TOOL ELEMENT

This application claims the benefit of U.S. Provisional Patent Application Ser. No. 60/232,656, filed Sep. 14, 2000.

FIELD OF THE INVENTION

The present invention relates generally to a rotate mechanism, and more particularly to a rotate mechanism that rotates a machine tool element.

BACKGROUND OF THE INVENTION

A rotate mechanism is a device that is utilized to quickly rotate a large mass, such as, for example, a mold component of an injection molding system, between two or more angular positions. In injection molding applications, it is advantageous to employ a rotating mold to accommodate multi-shot molding operations. For example, consider a two-shot injection molding process using a mold having cavities defining two parts to be molded. The mold rotates to allow each cavity to be exposed to two different molding operations, each operation providing one of the two shots of injection molding.

In such a device, the rotate mechanism is desirably adapted to accelerate the mold component quickly and then decelerate the component to a complete stop at the desired location without damaging the equipment and/or the mold component. In addition to mold components, other machine tool elements often have similar rotation requirements for use in carrying out other multistep work processes.

A number of rotate mechanisms have heretofore been designed; however, each of such designs has a number of drawbacks associated therewith. For example, rotate mechanisms have heretofore been designed in which the large mass is moved by use of an assembly including a rotary motor and a number of belts or chains which are entrained through a system of pulleys, gears, and/or sprockets. However, such rotate mechanisms are relatively mechanically complex thereby increasing costs associated with manufacture and maintenance of the mechanism.

Moreover, rotate mechanisms have also been designed in which the large mass is moved by use of a rack and pinion gear drive which is driven by air or hydraulic cylinders. However, it has been found that rotate mechanisms designed in such a manner are limited as to the amount of weight that they can adequately rotate and are generally less durable relative to other designs. Rotate mechanisms have also been designed to include an arrangement of electric servo motors and associated gear drives. While such designs have a number of desirable performance characteristics (e.g. relatively fast rotational velocities, high accelerations, and precise positioning), such designs are relatively expensive and, as a result, are seldom used.

Another heretofore designed rotate mechanism is shown in U.S. Pat. No. 5,837,301 issued to Arnott et al. Rotational movement is created by alternately moving a turret block in a linear direction toward and away from a fixed platen using of a cylinder assembly. In particular, as the turret block is moved away from the fixed platen, a sliding plate secured to an end of a linkage rod slides in a track defined in the fixed platen. When the sliding plate reaches the end of the track, the rod pulls the rotating turret thereby causing the rotating turret to rotate. When the turret block is at its furthest distance away from the fixed platen, the turret block has rotated through ninety degrees (90°) of travel. As the turret block is subsequently moved back toward the fixed platen, the rod pushes the turret block thereby causing the turret block to continue rotating in the same direction through the remaining ninety degrees (90°) of travel. As the turret block is moved away from the fixed platen during the next cycle of the mechanism, the process described above is repeated with the turret block being rotating in the opposite direction.

As described, the device disclosed in the Arnott reference relies on linear movement/displacement of the rotary platen (i.e. the turret block) in order to create the forces necessary to rotate the turret block. Hence, a relatively large operating area is required to accommodate for the linear motion of the turret block. Additionally, the device disclosed in the Arnott reference requires separate mechanisms (i.e. the cylinder assembly and the linkage rod) for providing the motive force to rotate the turret block and controlling the direction of rotation of the turret block thereby increasing the mechanical complexity of the device.

Another problem particularly related to injection molding and certain other types of processes arises from the large forces associated with the molding process. Injection molding presses can generate forces of 100 tons or more. When a rotate mechanism is used in such a device, the rotate mechanism may be subject to a greater part of that force. In particular, the rotate mechanism is subject to such force in the axial direction with respect to its direction of rotation. To withstand such axial force, it is desirable to maximize surface contact between the rotating element and the stationary element. The problem arises from the fact that such maximization of surface area undesirably inhibits rotation.

What is needed therefore is a rotate mechanism that overcomes one or more of the above-described drawbacks. What is particularly needed is a relatively cost effective, compact rotate mechanism that is capable of rotating relatively large masses very rapidly between stop locations. Such a rotate mechanism would desirably be capable of stopping at relatively precise locations, while also providing high rotational velocities and accelerations. Moreover, it is further desirable for such a rotate mechanism to be able to withstand large axial forces, such as those associated with a mold press.

SUMMARY OF THE INVENTION

The present invention addresses the above needs, as well as others, by providing a rotate mechanism that includes novel features discussed below. It will be appreciated that less than all of the novel features of the present invention may be employed to achieve at least some of the benefits described herein, as well as other benefits. However, the unique combination of features discussed herein provide a particularly useful combination of benefits.

A first embodiment of the present invention is a rotate mechanism that includes a fixed frame unit, a rotating frame unit, and a prime mover. The rotating frame unit is rotatably coupled to the fixed frame unit, and rotates about a stationary axis. The rotating frame unit including a first surface for receiving a machine tool element to be rotated. The prime mover is coupled to the rotating frame unit to effectuate rotational movement thereof.

The rotate mechanism described above rotates a machine tool element using a stationary axis of rotation. The use of a stationary axis, among other things, advantageous reduces the amount of space required for performing the work by the machine tool as compared to rotate mechanisms that require linear displacement.

A second embodiment of the invention includes a fixed frame unit, a rotating frame unit, a first bearing, and a prime mover. The rotating frame unit is rotatably coupled to the fixed frame unit and rotates about an axis. The rotating frame unit includes a first surface for receiving a machine tool element to be rotated. The first bearing is configured to exert an axially outward force on the rotating frame unit. The first bearing rotates about an axis that extends in substantially perpendicular to an axis of rotation of the rotating frame unit. The first bearing is axially movable within a cavity of at least one of the rotating frame unit and the fixed frame unit. The prime mover is coupled to the rotating frame unit to effectuate rotational movement thereof.

The use of a bearing that is axially moveably in a rotating frame unit allows the rotating unit to bear large amounts of axial force without subjecting the bearings to all of such force. When the excessive axial force is removed, the bearing may move outward to facilitate rotational movement of the rotating frame unit. The axial movement of the bearing in the cavity prolongs the life of the bearing in machine tools that generate large axial forces.

A third embodiment of the present invention is a rotate mechanism that includes a fixed frame unit, a rotating frame unit, a prime mover, and first, second and third bearings. The rotating frame unit is rotatably coupled to the fixed frame unit and rotates about an axis, The rotating frame unit includes a first surface for receiving a machine tool element to be rotated. The first bearing is configured to exert an axially outward force on the rotating frame unit, the first bearing rotating about an axis that extends in substantially perpendicular to an axis of rotation of the rotating frame unit. The second bearing has an axis of rotation that is substantially parallel to the axis of rotation of the rotating frame unit. The second bearing is disposed between the fixed frame unit and the rotating frame unit. The third bearing has an axis of rotation that is substantially perpendicular to the axis of rotation of the rotating frame unit, the third bearing configured to exert an axially inward force on the rotating frame unit.

The use of three types of bearings assists in facilitating quick acceleration as well as smooth and precise rotational travel, which in turn, reduces the time cycle of operation of the machine tool to which the rotate mechanism is connected.

The above described features and advantages, as well as others, will become readily apparent to those of ordinary skill in the art by reference to the following detailed description and accompanying drawings.

DETAILED DESCRIPTION OF THE INVENTION

Figure 1:
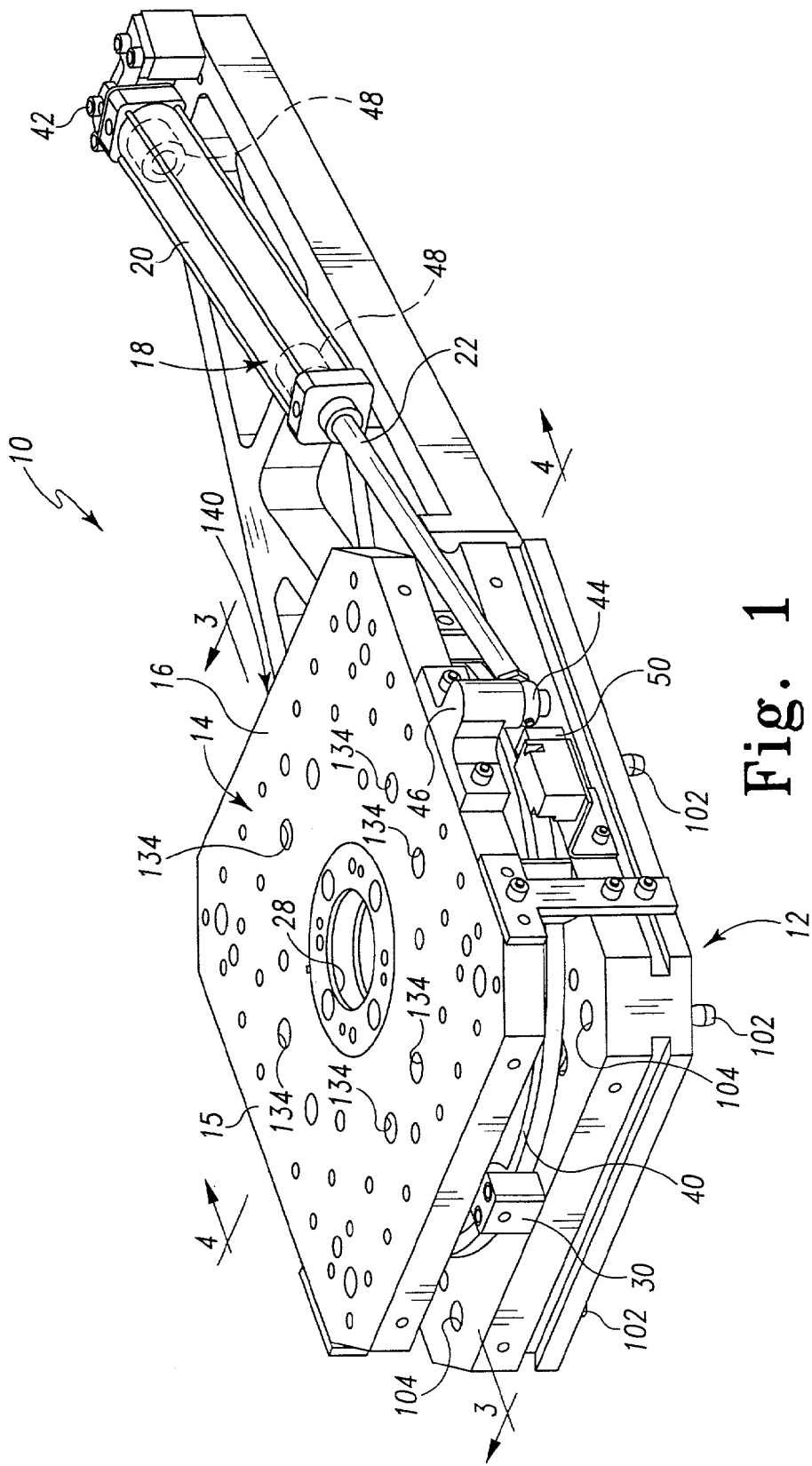
FIG. 1 is a perspective view of a rotate mechanism which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Reference is now made to FIGS. 1–4 which show a rotate mechanism 10 which incorporates the features of the present invention therein. The rotate mechanism 10 includes a fixed frame unit in the form of a fixed platen 12 and a rotating frame unit in the form of a rotating platen 14. The rotating platen 14 forms a structurally strong platform and includes a surface 15 for receiving a machine tool element of significant mass. By way of example, the surface 15 may be configured to receive a mold.

The fixed platen 12 may be rigidly secured to, for example, a machine base (not shown) by use of conventional fasteners such as bolts (not shown). To this end, the fixed platen includes a plurality of anti-rotation pins 102 that are configured to be received in corresponding bores (not shown) in the machine base. The anti-rotation pins 102 tightly fit into apertures 104 in the fixed platen 12 as well as the bores in the machine base to ensure that large rotational inertia of the rotating platen 14 does not cause inadvertent rotation of the fixed platen 12 when the rotating platen is stopped.

In alternative embodiments, the fixed platen 12 may be integrally formed with the machine base, thereby eliminating the need for the pins 102. However, the bolt-on design of the fixed platen 12 of the embodiment described herein advantageously allows the rotate mechanism 10 to be removable. Removability greatly increases the utility of the rotate mechanism 10 because it may be used on injection molding machines (or other molding machines) that sometimes perform runs that do not require the rotation function.

Figure 3:
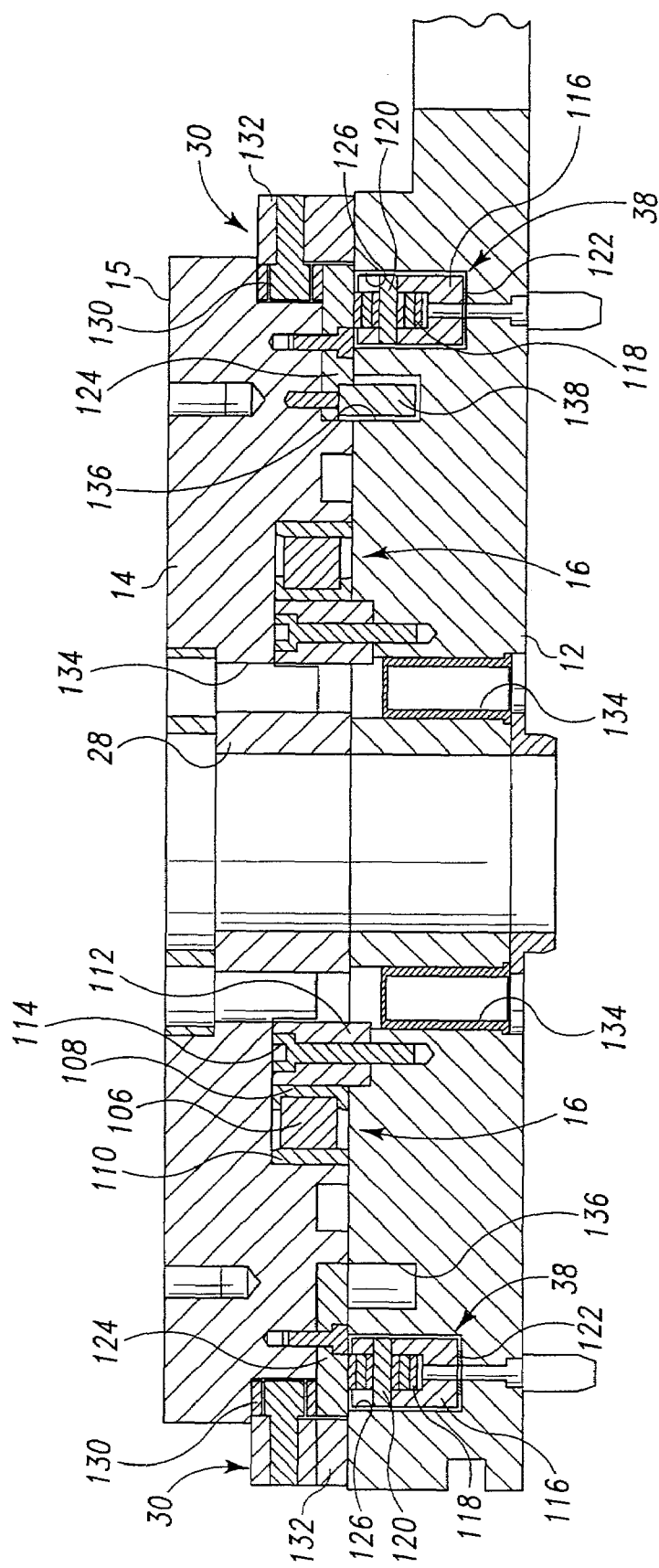
FIG. 3 is an enlarged cross sectional view taken along the line 3—3 of FIG. 1, as viewed in the direction of the arrows.

The rotating platen 14 is rotatably secured to the fixed platen 12 by a central radial support bearing assembly 16 (see FIG. 3). The bearing assembly includes a plurality of roller bearings 106, an inner race 108 disposed on the fixed platen 12, and an outer race 110 affixed to the rotating platen 14. The inner race 108 and outer race 110 are preferably formed of a high hardness steel. An elevated support ring 112 supports the inner race 108. To this end, the elevated support ring 112 extends axially upward to an extent sufficient to cover the axial height of the inner race 108. The support ring 112 is secured to the fixed platen 12 via a number of fasteners 114.

The bearing assembly 16 allows relatively uninhibited rotational movement between the fixed platen 12 and the rotating platen 14. To this end, the roller bearings 106 rotatably engage the inner race 108 and the outer race 110, thereby allowing rotation between the rotating platen 14 and the fixed platen 12 while exerting a radial force on the rotating platen 14.

A second set of bearings are employed to provide an axially outward force on the rotating platen 14. The axially outward force operates to separate the platens 12 and 14 by a sufficient amount to facilitate rotation. In accordance with one embodiment of the invention, the second set of bearings comprises a set of thrust bearing assemblies 38. The thrust bearing assemblies 38 are secured to the fixed platen 12 to reduce friction between the faces of the fixed platen 12 and the rotating platen 14. In general, the thrust bearing assemblies 38 are spring loaded into the fixed platen 12 such that when a substantial axial load is applied to the platens 12, 14 the bias of the springs associated with the thrust bearing assemblies 38 are overcome and the platens 12, 14 come to rest tightly against one another. The high axial load is then supported on the entire mating surfaces of the platens 12, 14, and not on the thrust bearing assemblies 38. This uniform loading of such axial forces is important for the function and durability of the rotate mechanism 10, particularly when used in a molding machine that could exert as much as 100 tons or more of axial pressure between the rotating platen 14 and the fixed platen 12.

When the high axial load is released form the platens 12, 14, the thrust bearing assemblies 38 displace or otherwise push the rotating platen 14 away from the fixed platen 12 by a small distance thereby allowing for relatively free rotation with low friction. The thrust bearing assemblies 38 also allow free rotary motion within themselves, exerting an axially outward force on the rotating platen 14. The axially outward force keeps the surfaces of the platens 12 and 14 separated to allow for ease of rotation.

While such a thrust bearing assembly could take many forms, the embodiment of the thrust bearing assembly 38 described herein includes a support 116, a wheel bearing 118, a center rod 120, and a low stroke, highly resilient spring device 122. By way of example, the spring device 122 may include one or more conical washers. In one embodiment the spring device 122 is a stack of four model 8-16-50 conical washers available from Solon Manufacturing Co.

The center rod 120 spans the support 116. The wheel bearing 118 is rotatably supported by the center rod 120 such that at least a portion of the outer diameter of the wheel bearing 118 extends axially outward from the support 116 and engages the rotating platen 14. More particularly, the wheel bearing 118 rotatably engages a race 124 on the rotating bearing 14. The race 124 is preferably a hardened steel insert located on the rotating bearing 14.

Much of the thrust bearing assembly 16 is located within a cavity 126 of the fixed platen 12. The conical washers (spring device 122) are interposed between the bottom 128 of the support 116 and the bottom of the cavity 126. Accordingly, when large axially inward pressure is applied to the rotating platen 114, the spring device 122 contracts or flattens, allowing the bearing assembly 16 to move further axially into the cavity 126, preferably so that the entire bearing assembly 16 is within the cavity. When the large axially inward pressure is relieved, the spring device 122 biases outward, thereby pushing at least a portion of the wheel bearing 118 out of the cavity 126 to allow the wheel bearing 118 to rotatably engage the rotating platen 14 while also holding the rotating platen 14 such that it is slightly spaced apart from the surface of the fixed platen 12.

In alternative embodiments, the thrust bearing assembly 38 could be located in a cavity on the rotating platen 14 in a similar configuration. Moreover, the thrust bearing assembly 38 may suitably include other types of bearings that rotate between races on either or both platens 12, 14, with one race supported by a spring device and one or both of the platens 12 and 14 including a cavity.

In any event, the bearing arrangement provides the low friction, relatively free rotation needed to attain desirable quick angular accelerations and the high angular velocities.

In addition to the above described bearings, the rotate mechanism 10 preferably also includes a series of rotary bearings 30 to exert axially inward forces to restrain the rotating platen 14 from excessive axially outward movement. Each of the rotary bearings 30 preferably includes a cam-follower type bearing 130 affixed to and extension block 132. The extension block 132 is located radially outward of the outer diameter of the rotating bearing 14, thereby allowing the extension block 132 extend axially past the surface of the fixed platen 12. The axis of rotation of the bearing 130 extends in a radial direction, or in other words perpendicular to the axis of rotation of the rotating platen 14. The bearing 130 extends radially into an annular groove 40 in the outer periphery of the rotating platen 14. The bearing 130 itself engages a race, which may suitably be the race 124, and exerts an axially inward force on the race 124 and thus the rotating platen 14.

Figure 4:
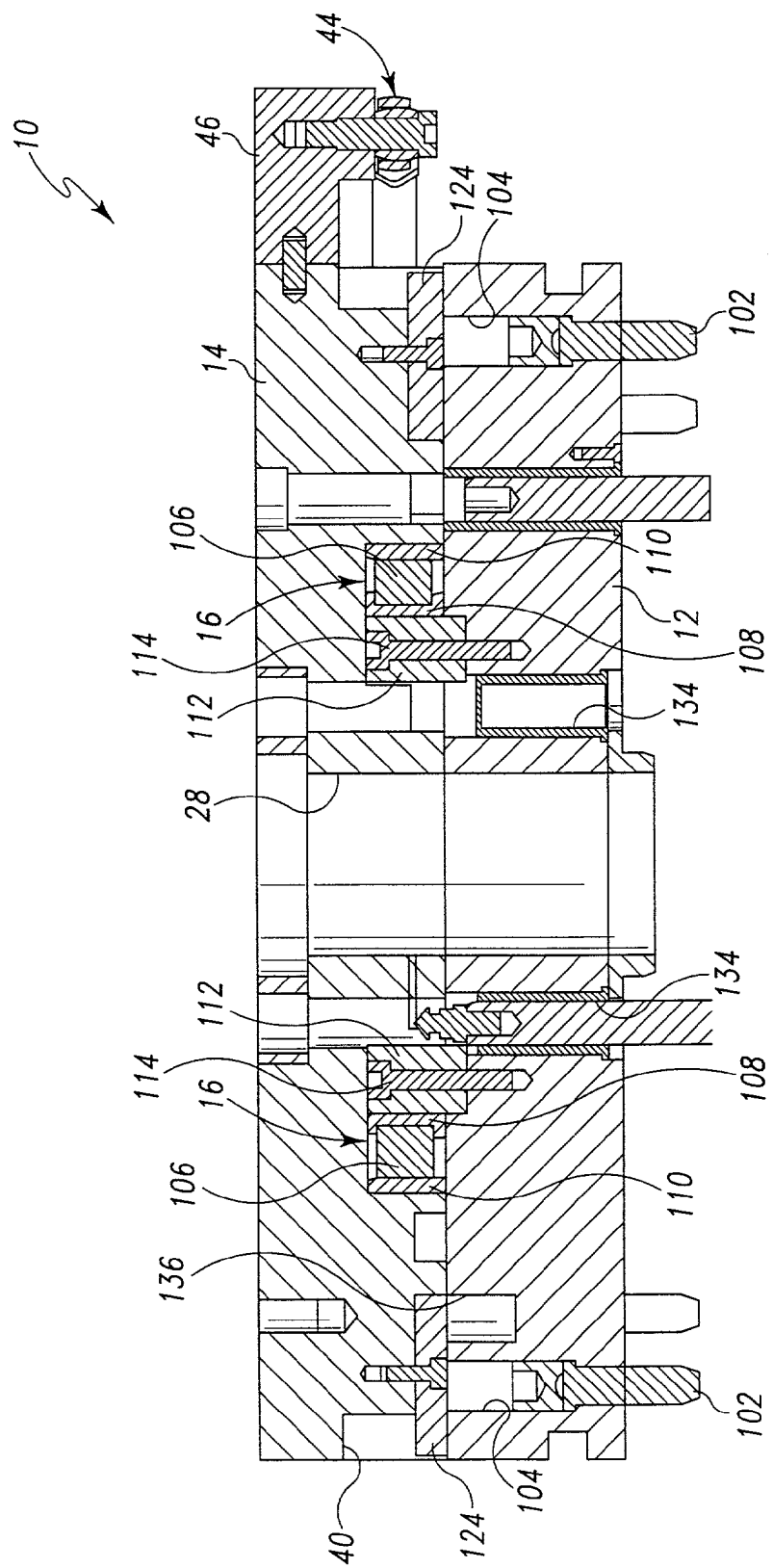
FIG. 4 is an enlarged cross sectional view taken along the line 4—4 of FIG. 1, as viewed in the direction of the arrows.

The rotating platen 14 further includes a centrally located aperture 28 that preferably overlaps its axis of rotation. The aperture 28 preferably aligns with a similar aperture in the fixed platen 12 to allow for the communication of wire, hoses and the like through both the fixed and the rotating platens 12 and 14. As shown in FIGS. 3 and 4, the radial support bearing assembly 16 is positioned around the aperture 28. The aperture 28 allows the routing of, for example, wires and hoses between the fixed machinery on which the rotate mechanism 10 is secured and the equipment mounted to the rotating platen 14. The use of the hollow aperture 28 provides a desirable location for routing such wires and hoses since rotary movement at this location is of a short radius thereby causing the linear component of such movement to be very small.

The rotate mechanism 10 also includes a prime mover assembly that effectuates the rotational movement of the rotating platen 14. In the exemplary embodiment described herein, the prime mover assembly includes a pneumatic cylinder assembly 18 that has a cylinder housing 20 and a rod 22. However, other reciprocating rod-type prime movers, such as for example, a solenoid device, may be substituted for the pneumatic cylinder assembly 18.

Figure 2:
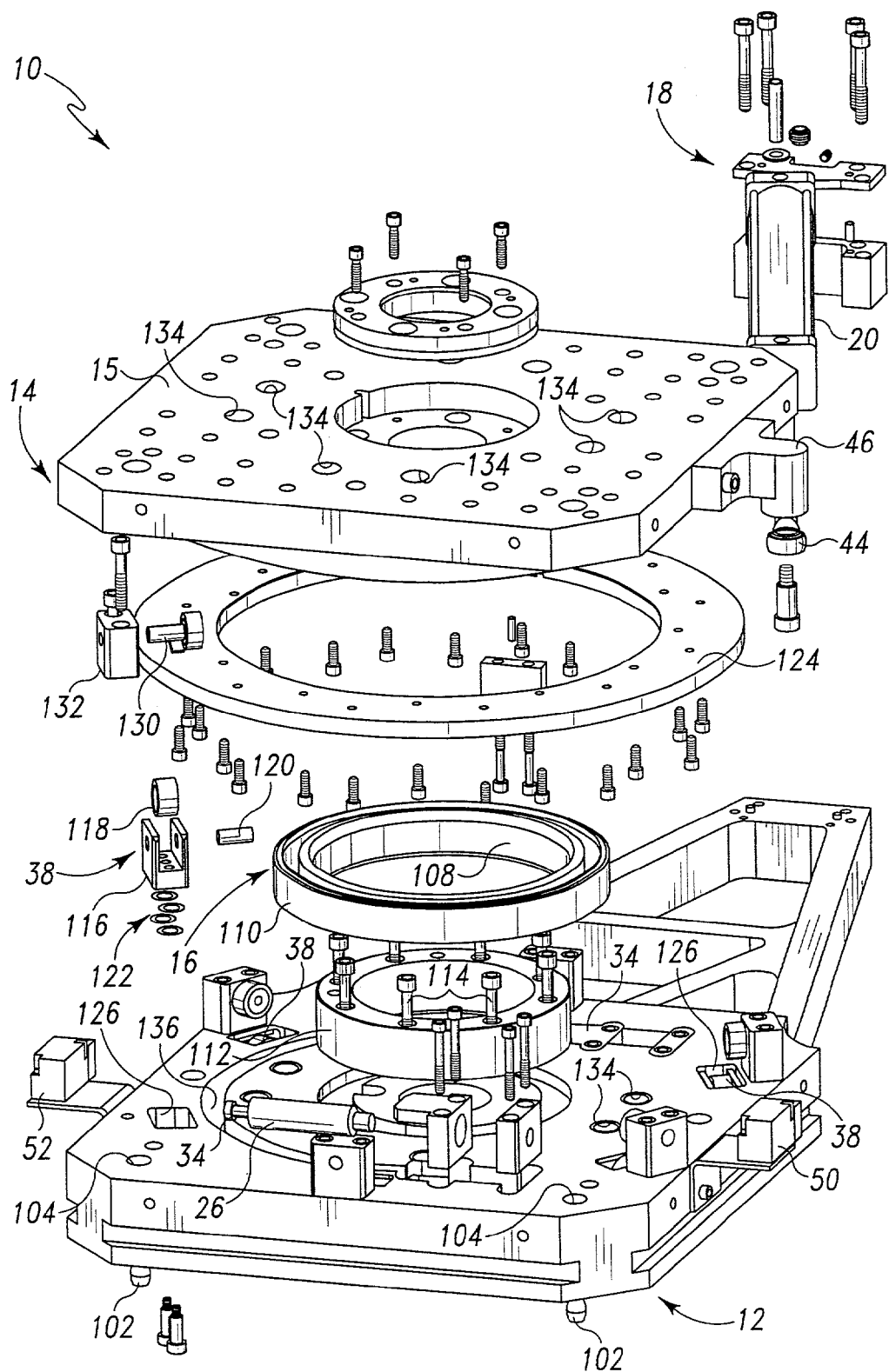
FIG. 2 is an exploded perspective view of the rotate mechanism of FIG. 1.

As shown in FIGS. 1 and 2, the head end of the housing 20 is secured via a swivel joint or ball joint 42 to the fixed platen 12, whereas the rod 22 is secured via a swivel or ball joint 44 to a flange 46 extending outwardly from the side of the rotating platen 14. The location at which the cylinder assembly 20 is secured to the fixed platen 12 is preferably located at or near the outer diameter of the rotating platen 14 to increase leverage. The ball joints 42, 44 at each end compensate for any axial movement between the fixed platen 12 and the rotating platen 14 without adding undesired restraints or a bending moment to the cylinder assembly 18.

Two stops 34 are located on the fixed platen 12, preferably within a stop channel 136 defined therein. The stop channel 136 forms an axial channel in the fixed platen 12 and extends as an arc approximately one hundred eighty degrees. The stop channel 136 terminates at either end with the stops 34. The stops 34 include piston and cylinder dampening mechanisms 26 that assist in absorbing the energy created by stopping the rapid rotation of the rotating platen 14 (and its cargo). The rotating platen 14 includes a protrusion 138 that is configured to be received into the stop channel 136 and engage the stops 34 at the further extents of travel of the rotating platen 14. Accordingly, the angular location of the protrusion 138 should be coordinated with the angular location of attachment of the ball joint 44 to ensure that the protrusion 138 engages the stops 34 when the ball joint 44 is approximate ninety degrees from its "top dead center" point 140 in either direction. The top dead center point 140 is the point in which the rod 22 is at its most retracted point.

The cylinder assembly 18 not only provides the motive force for rotating the rotating platen 14, but also controls the direction of rotation of the rotating platen 14. In particular, when movement of the rotating platen 14 is desired, the rod end of the cylinder housing 20 is rapidly filled with high-pressure air so as to rapidly retract the rod 22 into the housing 20 thereby accelerating the rotating platen 14. As the rod 22 reaches its fully retracted position, the rotating platen 14 has traveled through approximately ninety degrees of rotation to the top dead center point. Thereafter, the air pressure supply is toggled from the rod end of the housing 20 to the head end of the housing 20 thereby extending or otherwise urging the rod 22 outwardly from the housing 20 so as to move the rotating platen 14 through the remaining approximately ninety degrees of rotation. In other words, the cylinder assembly 18 "pulls" the rotating platen 14 through its initial ninety degrees of rotation and "pushes" the rotating platen 14 through its final ninety degrees of rotation. During the travel, the protrusion 138 travels in the channel 136 between the stops 34.

The toggling of the air supply is preferably electronically controlled by a controller (not shown) associated with the rotate mechanism 10. Moreover, the cylinder assembly 18 is preferably configured to include a number of position sensors so as to provide positional feedback to the controller, as is known in the art. It should be appreciated that it may be possible to allow the inertia of the rotating platen 14 to toggle the air supply from one side of the cylinder assembly 18 to the other. Additionally, in certain configurations of the rotate mechanism 10, air pressure within the cylinder housing 20 may be reduced or even completely removed at some point past the "top dead center" position 140 of the cylinder assembly 18 (i.e. the fully retracted position) as inertia may be all that is necessary to finish the rotation of the rotating platen 14.

Moreover, as shown in FIG. 1, the cylinder assembly 18 itself may contain a pair of internal dampeners 48. The internal dampeners 48 are located at each end (i.e. the rod end and the head end) of the cylinder housing 20. The internal dampeners 48 are provided to dissipate the kinetic energy within the rod 22 from the inertia of the rotating platen 14.

The exemplary embodiment of the rotate mechanism 10 described herein also includes position switches 50 and 52 that provide feedback as to the end position of the rotating platen 14. The position switches 50 and 52 are preferably located such that they are engaged by a protrusion on the rotating platen 14 at either end of the travel of the rotating platen 14. In the exemplary embodiment described herein, the position switches 50 and 52 are located opposite each other, ninety degrees in either direction from the top dead center point 140. In the exemplary embodiment describe herein, the ball joint 44 acts as the protrusion that engages the position switches 50 and 52 at either end of rotational travel. The position switches 50, 52 provide important position feedback to avoid potentially damaging operation.

For injection molding applications, the rotating platen 14 and the fixed platen 12 are provided with a plurality of aligned through-channels 134 dispersed throughout. The through-channels 134 provide a linear travel channel for ejection drive pins or mechanisms. In particular, injection molding processes (and other machine tool processes) typically employ retractable ejection mechanisms to assist in removing a work piece from a mold or other work space. The rotate mechanism 10 provides through channels to allow drive pins or drive mechanisms for the ejection mechanism when the rotate mechanism 10 is stopped at one or more rest positions where ejection would take place. To this end, the through-channels 134 of each of the rotating platen 14 and the fixed platen 12 should be configured to align in any rotation position in which ejection may occur.

OPERATION OF THE PRESENT INVENTION

In operation, the mass to be rotated (e.g. a mold of a two-shot injection molding operation) is secured to the upper surface 15 of the rotating platen 14. The rotating platen 14 is initially stopped against one of the dampeners 26. As shown in FIG. 1, when positioned in such a manner, the rod 22 is positioned in its extended rod position in which substantially the entire length of the rod 22 extends out of the cylinder housing 20. When movement is desired, the rod end of the cylinder housing 20 is rapidly filled with high pressure air thereby causing the rod 22 to be rapidly retracted into the cylinder housing 20. As the rod 22 is retracted, the rod 22 pulls or otherwise urges the rotating platen 14 thereby causing the rotating platen 14 to be rotated about its axis in a rotary direction toward the dampener 26 on the other side of the fixed platen 12.

When the rotating platen 14 has rotated through half of its angular range of motion (i.e. approximately ninety degrees of rotation), the cylinder assembly 18 is positioned in a retracted position in which the rod 22 is retracted into the housing 20.

Contemporaneously, the air pressure supply is toggled from the rod end of the cylinder housing 20 to the head end of the cylinder housing 20 thereby causing the rod 22 to be extended outwardly from the cylinder housing 20 so as to urge the rotating platen 14 along its angular path toward the dampener 26. When the rotating platen reaches the limits of its rotation, a portion of the rotating platen contacts the dampener 26 so as to bring the rotating platen 14 to a controlled stop. At this point, the rod 22 is, once again, fully extended from the cylinder housing 20. The process is then repeated to rotate the rotating platen 14 back to its original position.

The above operation is particularly suited to a two-shot molding operation with two molding stations formed within the mold, not shown, that is attached to the surface 15 of the rotating platen 14. In a first position, as shown in FIG. 1, the mold is ready for injection of molten material. To inject the molten material, the mold press exerts large amounts of axial pressure on the mold and hence the rotating platen 14. In response to the large axial forces, the spring devices 122 of the thrust bearing assemblies 38 compress, thereby causing the thrust bearing assemblies 38 to move axially further into the cavity 126. When the thrust bearing assemblies 38 are further into the cavity 126, full surface contact between the rotating platen 14 and the fixed platen 12 results. Thus, the large axial pressure, which may exceed 100 tons, is borne by the opposing surfaces of the rotating platen 14 and the fixed platen 12, and not solely by a few bearings.

When the first injection operation is complete, the mold press releases the axial pressure. After the pressure is released, the spring devices 122 return to there normal extended state, thereby pushing the thrust bearing assemblies 38 axially outward. The thrust bearing assemblies 38, in turn, separate the opposing surfaces of the rotating platen 14 and the fixed platen 12. Because the surfaces of the platens 12 and 14 are not longer in contact, the rotating platen 14 may freely rotate on the bearings 118, as well as on the bearing assemblies 16 and 30.

The pneumatic cylinder 18 (or other prime mover) then operates to rotate the rotating platen 14 approximately one hundred eighty degrees. At this point, a finished part may be ejected. Thereafter, more molten material is injected. To this end, the mold press again exerts an axially inward force on the rotating platen 14. As above, the thrust bearing assemblies 38 move further into the cavities 136 to allow full surface-to-surface contact between the platens 12 and 14 to bear the force. Once the injection step is completed, the mold press releases and the thrust bearing assemblies 38 move the rotating platen 14 axially outward for the next rotation. Another finished part is then ejected.

Accordingly, the present invention includes many advantages arising from a structure that allows quick rotation, quick stops, a moving bearing structure, and other elements described herein. It will be appreciated that at least some of the advantages of the present invention may be obtained through the inclusion of some, but not all, of the features described herein.

It will be appreciated, for example, that at least some of the advantages of employing the three distinct sets of bearings may be obtained even in a system that employs a convention prime mover such as those described in the prior art. Likewise, at least some of the advantages of employing an axially moveable bearing may be obtained regardless of the type of prime mover used. Accordingly, the appended claims describe the scope of the invention, and such scope is not intended to be limited by the exemplary embodiment described herein.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

We claim:

1. A rotate mechanism comprising:
   a fixed frame unit:
   a rotating frame unit, the rotating frame unit rotatably coupled to the fixed frame unit, the rotating frame unit rotating about a stationary axis, the rotating frame unit including a first surface for receiving a machine tool element to be rotated:
   a prime mover coupled to the rotating frame unit to effectuate rotational movement thereof, wherein the prime mover includes a reciprocating device having a first end and a second end, the first end coupled to a fixed structure, the second end coupled to the rotating frame unit.

2. The rotate mechanism of claim 1 further comprising a first bearing having an axis of rotation substantially parallel to an axis of rotation of the rotating frame unit, the first bearing disposed between the fixed frame unit and the rotating frame unit.

3. The rotate mechanism of claim 2 further comprising a second bearing having an axis of rotation that is substantially perpendicular to the axis of rotation of the rotating frame unit.

4. The rotate mechanism of claim 3 wherein the second bearing is configured to exert an axially inward force on the rotating frame unit.

5. The rotate mechanism of claim 4 wherein the second bearing rotatably engages the rotating frame unit.

6. The rotate mechanism of claim 4 further comprising a third bearing, the third bearing configured to exert an axially outward force on the rotating frame unit.

7. The rotate mechanism of claim 6, wherein the third bearing rotatably engages the rotating frame unit.

8. The rotate mechanism of claim 2 wherein the second bearing is configured to exert an axially outward force on the rotating frame unit.

9. The rotate mechanism of claim 1 further comprising a first bearing configured to exert an axially outward force on the rotating frame unit, the first bearing rotating about an axis that extends substantially perpendicular to an axis of rotation of the rotating frame unit, the first bearing axially movable within a cavity of at least one of the rotating frame unit and the fixed frame unit.

10. The rotate mechanism of claim 1 wherein the prime mover comprises a pneumatic cylinder.

11. A rotate mechanism comprising:
    a fixed frame unit;
    a rotating frame unit, the rotating frame unit rotatably coupled to the fixed frame unit, the rotating frame unit rotating about an axis, the rotating frame unit including a first surface for receiving a machine tool element to be rotated;
    a first bearing configured to exert an axially outward force on the rotating frame unit, the first bearing rotating about an axis that extends substantially perpendicular to an axis of rotation of the rotating frame unit, the first bearing axially movable within a cavity of at least one of the rotating frame unit and the fixed frame unit; and
    a prime mover coupled to the rotating frame unit to effectuate rotational movement thereof.

12. The rotate mechanism of claim 11 wherein the first bearing is axially moveably secured to the fixed frame unit, the first bearing rotatably engaging the rotating frame unit.

13. The rotate mechanism of claim 12 further comprising a compressible spring mechanism disposed between the first bearing and the fixed frame unit.

14. The rotate mechanism of claim 13 wherein the compressible spring mechanism comprises at least one conical washer.

15. The rotate mechanism of claim 11 further comprising:
    a second bearing having an axis of rotation substantially parallel to the axis of rotation of the rotating frame unit, the second bearing disposed between the fixed frame unit and the rotating frame unit;
    a third bearing having an axis of rotation that is substantially perpendicular to the axis of rotation of the rotating frame unit, the third bearing configured to exert an axially inward force on the rotating frame unit.

16. The rotate mechanism of claim 11 wherein the prime mover comprises a pneumatic cylinder.

17. A rotate mechanism comprising:
    a fixed frame unit;
    a rotating frame unit, the rotating frame unit rotatably coupled to the fixed frame unit, the rotating frame unit rotating about an axis, the rotating frame unit including a first surface for receiving a machine tool element to be rotated;
    a first bearing configured to exert an axially outward force on the rotating frame unit, the first bearing rotating about an axis that extends substantially perpendicular to an axis of rotation of the rotating frame unit,
    a second bearing having an axis of rotation substantially parallel to the axis of rotation of the rotating frame unit, the second bearing disposed between the fixed frame unit and the rotating frame unit;
    a third bearing having an axis of rotation that is substantially perpendicular to the axis of rotation of the rotating frame unit, the third bearing configured to exert an axially inward force on the rotating frame unit.

18. The rotate mechanism of claim 17 wherein the first bearing is axially movable within a cavity of at least one of the rotating frame unit and the fixed frame unit.

19. The rotate mechanism of claim 18 wherein the first bearing is axially moveably secured to the fixed frame unit, the first bearing rotatably engaging the rotating frame unit.

20. The rotate mechanism of claim 19 wherein the second bearing rotatably engages the rotating frame unit.

21. The rotate mechanism of claim 20 wherein the third bearing rotatably engages the rotating frame unit.

22. A method of rotating a machine tool element comprising:

securing the machine tool element to a first surface of a rotating frame unit, the rotating frame unit rotatably fixed to a fixed frame unit; and rotating the rotating frame unit about a stationary axis to rotate the machine tool element using a reciprocating prime mover.

23. The method of claim 22 further comprising exerting an axially outward force on the rotating frame unit using a first bearing, the first bearing rotating about an axis that extends substantially perpendicular to an axis of rotation of the rotating frame unit, the first bearing axially movable within a cavity of at least one of the rotating frame unit and the fixed frame unit.

24. The method of claim 23 further comprising employing a machine tool to exert an axially inward force on the rotating frame unit, said axially inward force causing axially inward movement of the first bearing.

* * * * *